United States Patent [19]

Cap

[11] 4,391,398
[45] Jul. 5, 1983

[54] METHOD OF TENSIONING A TAPE
[75] Inventor: Heinrich Cap, St. Georgen, Fed. Rep. of Germany
[73] Assignee: Papst Motoren GmbH & Co. KG, St. Georgen, Fed. Rep. of Germany
[21] Appl. No.: 122,684
[22] Filed: Feb. 19, 1980
[30] Foreign Application Priority Data
Feb. 26, 1979 [CH] Switzerland .................. 1886/79
[51] Int. Cl.³ ............................................. B65H 23/22
[52] U.S. Cl. ......................................... 226/4; 226/195
[58] Field of Search .............................. 242/200–210, 242/75.3, 191; 226/188, 195, 181, 1, 4

[56] References Cited
U.S. PATENT DOCUMENTS
2,564,274 8/1951 Pratt et al. .................. 242/201 X
3,743,157 7/1973 Mason ........................... 226/195

Primary Examiner—Leonard D. Christian
Attorney, Agent, or Firm—Michael J. Striker

[57] ABSTRACT

A tape of a tape-recording device passes between a braking roller, a first sound shaft, a second sound shaft, and a pulling roller located one after the other. The pulling forces of the rollers and the slips of the tape of the sound shafts are adjusted so that the pulling force of the tape between the braking roller and the first sound shaft and the pulling force of the tape between the first and second sound shafts are directed toward the braking roller whereas the pulling force of the tape between the second sound shaft and the pulling roller changes the direction to the opposite and is smaller than the pulling force of the tape between the first and second sound shafts.

5 Claims, 1 Drawing Figure

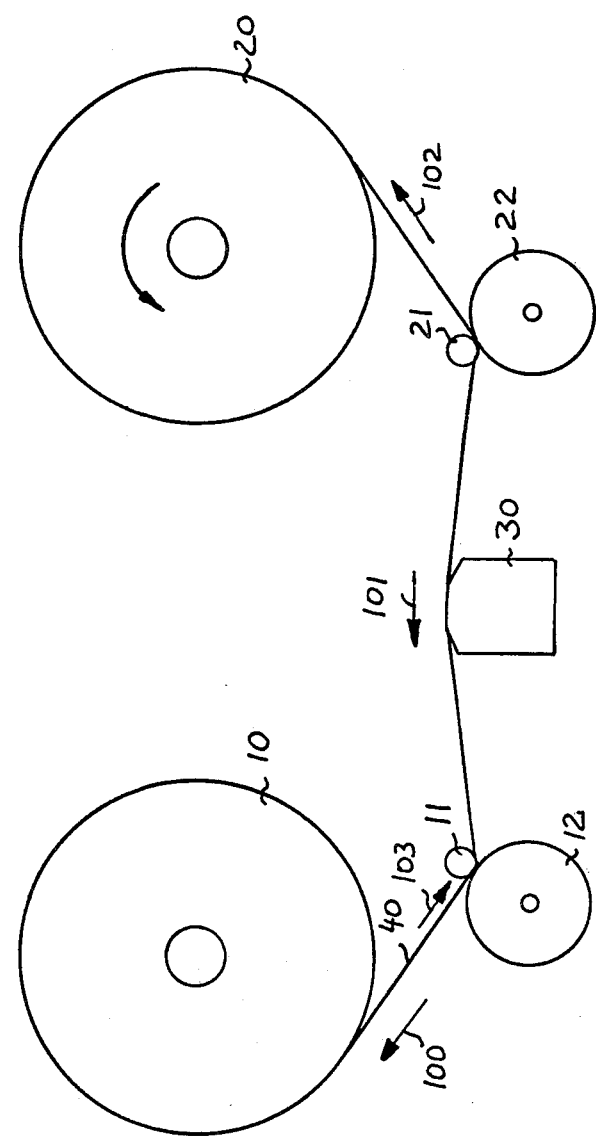

METHOD OF TENSIONING A TAPE

BACKGROUND OF THE INVENTION

The present invention relates to a method of and an arrangement for attaining a tape-protective tensioning of a tape in tape-recording devices. More particularly, it relates to a method of and an arrangement for tensioning a tape in a tape-recording device with a braking roller, a pulling roller, two sound shafts rotating with approximately equal angular speed, and at least one sound head.

Known tape-recording devices encounter the problem in that they must provide for a firmest possible abutment of the sound tape against the sound head in order to eliminate undesirable variations of amplitude during recording and reproduction, particularly when separate head systems for recording and reproduction are utilized in cassette devices. This problem particularly arises when two sound shafts are utilized, in order to attain the sufficient tape-head contact. In such a device contrary to the device with only one sound shaft, the driving force is indetermined statically. In addition, when the fixed axis of rotation normal to the tape plane extends downwardly of the tape toward the sound shaft, the tape drive is mechanically instable, inasmuch as even small deflections of the sound tape parallel to the sound shaft are automatically increased. When the fixed axis of rotation normal to the tape plane extends upwardly of the sound tape, deflections of the sound tape parallel to the axis of the sound shaft are automatically compensated. Pulled sound shafts are mechanically instable, and driven sound shafts have a stable tape position (RADIO MENTOR ELECTRONIC, 11/78-198).

SUMMARY OF THE INVENTION

Accordingly, it is an object of the present invention to provide a method of and arrangement for tensioning a tape in a tape-recording device, in accordance with which, two sound shafts are provided and guarantee a mechanically stable position of a sound tape.

In keeping with these objects and with others which will become apparent hereinafter, one feature of the present invention resides, briefly stated, in a method of tensioning of a tape of a tape recording device including a braking roller, a pulling roller, and two sound rollers located therebetween, in accordance with which method the pulling forces of the rollers and the slip of the tape on the sound shafts are so adjusted that the pulling force of the tape upstream and downstream of the sound shafts following the braking roller is directed toward the latter, whereas the pulling force changes its direction on the second sound shaft.

In accordance with another feature of the present invention an arrangement for tensioning a tape in a tape-recording device is provided in which the pulling forces of the rollers and the slips of the sound shafts are also adjusted so as to attain the above-mentioned relation between the pulling forces of the tape.

When the method is performed and the arrangement is designed in accordance with the applicant's invention, both sound shafts no more drive the sound tape, inasmuch as both sound shafts must overcome a force which acts in the direction opposite to the running direction of the sound tape, whereby by both sound shafts stable tape positions are attained. The loading of the edges of the tape by guiding means is thereby neglectibly small and therefore a tape protection is attained. The passage of the pulling force of the tape through the first sound shaft toward the tape portion located between the first and the second sound shafts (counted from the braking roller) can be adjusted by the pressure of the first pressure roller, therefore, by the slip. It is however, not greater than in the arrangements in which the tensioning of the tape between the sound shafts is determined by adjustment of the force originated from the pulling roller.

In accordance with a further feature of the present invention, the braking roller, the pulling roller and the first and second sound shafts are reversible so that the functions of the drive elements can be reversed. In this case the operation of the arrangement corresponds to the "autoreverse" operation in which the braking roller serves as the pulling roller, the first sound shaft serves as the second sound shaft, and the second shaft serves as the first sound shaft. In such a construction, immediately after reaching of the tape end, the direction of functioning is reversed and the tape is switched to the second sound track so that the playing of the second sound track can immediately start. In accordance with the invention, such operation is also performed with stable run of the tape. In order to attain this, the braking roller must provide for the same pulling force of the tape as the roller which now works as the pulling roller and which has worked before as the braking roller. This can be attained by provision of mechanical or electrical tape brakes, however, the above-mentioned results can be provided easier with the aid of the electrical tape brakes. In this case the pressure of both pressure rollers must be the same, or measures must be taken which provide for the reverse of the pressure force of the pressure rollers.

In accordance with a further advantageous feature of the present invention, the sound shafts rotate in synchronism with each other. This can be attained in the case when they are driven by the common drive means. A stable run of the tape was not possible in this case in the known arrangements and methods.

Especially high tape protection and uniform run of the tape is attained when the forces are symmetrical relative to the second sound shaft, since no slip is possible in this case on the second sound shaft. Such a fine determination of the pulling force of the tape is possible especially in electrically controllable pulling roller and braking roller.

It is also possible that further sound shafts are provided between the first and the second sound shafts, and the pulling force of the tape upstream and downstream of the further sound shafts is directed toward the braking roller. Thereby a stable tape run can be attained also in completely overdetermined systems.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a schematic view showing an arrangement designed in accordance with the present invention and performing the inventive method.

DESCRIPTION OF A PREFERRED EMBODIMENT

An arrangement for tensioning a tape in a tape-recording device is shown schematically in the drawing and has a braking roller 10 from which a sound tape 40 runs and is braked with a pulling force 100 of for example 20 p (pond) on a sound shaft 11. The sound shaft 11 together with a pressure roller 12 displaces the sound tape in the direction 103 toward a sound head 30. A slip takes place between the sound shaft 11 and the pressure roller 12, the slip relatively too slowly displacing the sound tape 40.

A sound shaft 21 is further provided. The sound shaft 21 is driven by the same drive means by which the sound shaft 11 is driven. This can be done for example by a common belt which drives both sound shafts in rotation. When the sound shafts 21 and 11 are driven by the same drive means, the sound tape 40 obtains a pulling force which is directed in the direction 101 and provides well abutment of the sound tape 40 against the sound head.

On the other hand, the pulling force 101 which is caused by the "passage" of the force 100 over the drive point 11–12, cannot lead to slip of the sound shaft 11 and thereby inherently unstable run of the tape over the sound shaft 11. The pulling force 101 can be equal, for example, to 2 p. However, the sound shaft 21 retains the ability to pull the sound tape 40 and thereby to provide the inherent stability of the tape run.

A pulling roller 20 is further provided after the sound shaft 21. The pulling roller is so adjusted that a pulling force 102 acts over the pressure roller in the direction opposite to the running direction of the tape. The pulling force 102 may be smaller than the pulling force 101. In this case, the sound shaft 21 has the ability to apply a transporting pulling force to the sound tape 40. In this case, a change of sense of the pulling force on the sound shaft 21 takes place, whereby the sound tape behind the sound shaft 21 remains tensioned. The advantageous condition is attained when the pulling forces 101 and 102 are of equal magnitudes, inasmuch as no slip takes place over the sound shaft, despite the fact that both sound shafts 11 and 21 simultaneously apply a pulling force to the tape, the inherently stable tape run takes place, and the tape over its entire length remains tensioned with well abutment against the sound head 30.

A so-called "auto-reverse" operation can be attained when the braking roller 10 serves as a pulling roller, and the pulling roller 20 serves as a braking roller. The pulling force 100 must be applied from the new braking roller 20, and the pulling force 102 must be applied from the new pulling roller 10. The pulling force 101 changes its direction, when the passage of the braking force 100 through the pair 21–22 have the same magnitude as the passage through the pair 11–12, when in condition of identical outer surface properties both pairs exerts identical pressure.

An additional such pair may be provided between the sound shafts 11 and 21. In this case it is necessary to adjust the slip of all sound shafts so as to attain the passage of the braking force to the portion of the tape located behind a respective sound shaft, in order to provide for a pulling force in the tape in direction toward the braking roller. The pulling force of the tape must change its direction on the sound shaft which is located adjacent to the pulling roller so as to attain a sense variation. The passage is also adjusted here by slip and pressure, and in the case of the auto-reverse operation is identical for all sound shafts.

It will be understood that each of the elements described above, or two or more together, may also find a useful application in other types of constructions differing from the types described above.

While the invention has been illustrated and described as embodied in a method of and an arrangement for tensioning a tape in a tape-recording device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of tensioning a tape in a tape recording device, comprising the steps of passing a tape between a braking roller, a first sound shaft, a second sound shaft, and a pulling roller located one after the other so that the tape runs with counteracting pulling forces and slips over the sound shafts; and adjusting the pulling forces of the rollers and the slip of the tape on the sound shafts so that one pulling force of the tape between the braking roller and the first sound shaft, and another pulling force of the tape between the first and second sound shafts act in a direction toward the braking roller, whereas a further pulling force of the tape between the second sound shaft and the pulling roller acts opposite to said direction, and also so that the first sound shaft reduces the one pulling force between the braking roller and the first sound shaft and thereby the other pulling force between the first and second sound shafts is smaller than said one pulling force, and the second sound shaft reduces the other pulling force between the first and second shafts so that the further pulling force between the second sound shaft and the pulling roller is smaller than said other pulling force.

2. A method as defined in claim 1, wherein said step of passing includes driving said rollers and said sound shafts in one direction; and further comprising the step of driving said rollers and said shafts in another direction which is opposite to said one direction so as to reverse the functions of the same.

3. A method as defined in claim 1, wherein said first and second sound shafts rotate synchronically with one another.

4. A method as defined in claim 1, wherein the pulling force of the tape between the first and second sound shafts and the pulling force of the tape between the second sound shaft and the pulling roller are symmetrical relative to the second sound roller.

5. A method as defined in claim 1; and further comprising the step of providing at least one further such sound shaft between the second and first sound shafts, and adjusting the same so that the pulling forces of the tape between the first sound shaft and each of the first and second sound shafts is directed towards said braking rollers.

* * * * *